United States Patent
Hiraga

(10) Patent No.: US 10,035,206 B2
(45) Date of Patent: Jul. 31, 2018

(54) CONTROLLER FOR WIRE ELECTRIC DISCHARGE MACHINE HAVING CONSUMABLE EXCHANGE FUNCTION

(71) Applicant: FANUC Corporation, Yamanashi (JP)

(72) Inventor: Kaoru Hiraga, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 281 days.

(21) Appl. No.: 14/971,344

(22) Filed: Dec. 16, 2015

(65) Prior Publication Data
US 2016/0175956 A1    Jun. 23, 2016

(30) Foreign Application Priority Data

Dec. 17, 2014  (JP) .................................. 2014-255265

(51) Int. Cl.
| | |
|---|---|
| B23H 1/02 | (2006.01) |
| B23H 7/20 | (2006.01) |
| B23H 11/00 | (2006.01) |
| G05B 19/18 | (2006.01) |

(52) U.S. Cl.
CPC .................. B23H 1/02 (2013.01); B23H 7/20 (2013.01); B23H 11/00 (2013.01); G05B 19/182 (2013.01); *G05B 2219/45043* (2013.01); *G05B 2219/45221* (2013.01)

(58) Field of Classification Search
None
See application file for complete search history.

(56) References Cited

U.S. PATENT DOCUMENTS

| | | | | |
|---|---|---|---|---|
| 4,689,457 | A * | 8/1987 | Izumiya | .................. B23H 7/10 219/69.12 |
| 5,072,089 | A * | 12/1991 | Higashi | .................. B23H 7/02 219/69.12 |
| 5,081,332 | A | 1/1992 | Sakuragawa | |

(Continued)

FOREIGN PATENT DOCUMENTS

| | | |
|---|---|---|
| CN | 105689825 A | 6/2016 |
| JP | 61-121832 A | 6/1986 |

(Continued)

OTHER PUBLICATIONS

Office Action in KR Application No. 10-2015-0179900, dated Aug. 8, 2017, 8 pp.

(Continued)

*Primary Examiner* — Jason Lin
(74) *Attorney, Agent, or Firm* — Hauptman Ham, LLP

(57) ABSTRACT

A controller for a wire electric discharge machine recognizes that a consumable, such as a filter, an electrode pin, and an ion exchange resin, has reached the end of its life and the timing at which discharge machining is interrupted and temporarily stops programmed operation in accordance with the timing. When receiving an evaluation result representing that time for exchange of the consumable has been reached, the controller instructs a consumable exchanging unit, such as a robot, to cause it to exchange the consumable for automatic exchange of the consumable. After the consumable has been exchanged, a programmed operation resumption instructing unit resumes the programmed operation.

4 Claims, 4 Drawing Sheets

(56) References Cited

U.S. PATENT DOCUMENTS

| | | | |
|---|---|---|---|
| 5,514,941 A * | 5/1996 | Kita | B23H 7/04 |
| | | | 318/569 |
| 5,756,954 A * | 5/1998 | Kamiguchi | B23H 7/065 |
| | | | 219/69.12 |
| 5,914,054 A | 6/1999 | Ito et al. | |
| 2002/0134759 A1 * | 9/2002 | Kita | B23H 1/10 |
| | | | 219/69.14 |
| 2004/0238417 A1 | 12/2004 | Arakawa et al. | |
| 2009/0134126 A1 * | 5/2009 | Katougi | B23H 1/022 |
| | | | 219/69.13 |
| 2011/0100959 A1 * | 5/2011 | Onodera | B23H 7/065 |
| | | | 219/69.13 |
| 2015/0202701 A1 * | 7/2015 | Hara | B23H 1/02 |
| | | | 700/162 |
| 2016/0096231 A1 * | 4/2016 | Nishikawa | B23H 1/10 |
| | | | 210/90 |
| 2016/0158863 A1 | 6/2016 | Hiraga | |

FOREIGN PATENT DOCUMENTS

| | | |
|---|---|---|
| JP | 64-11725 A | 1/1989 |
| JP | 2-41821 A | 2/1990 |
| JP | H05-42414 A | 2/1993 |
| JP | H05-305520 A | 11/1993 |
| JP | 7-178622 A | 7/1995 |
| JP | H07-266137 A | 10/1995 |
| JP | H08-118151 A | 5/1996 |
| JP | H09-216129 A | 8/1997 |
| JP | 2003-025155 A | 1/2003 |
| JP | 2004-358573 A | 12/2004 |
| JP | 2008-102865 A | 5/2008 |
| JP | 2010-179377 A | 8/2010 |
| JP | 5507024 B1 | 5/2014 |
| KR | 1996-0004236 B1 | 3/1996 |

OTHER PUBLICATIONS

Office Action in CN Application No. 201510954581.7, dated Aug. 21, 2017, 13 pp.

Office Action in JP Application No. 2014-255265, dated Mar. 8, 2016.

Extended European Search Report in EP Application No. 15197953.1, dated Apr. 25, 2016.

* cited by examiner

FIG.3

```
MAIN PROGRAM
O1000;
M60;            ・・・CONNECT WIRE
M98P100;
M50;            ・・・CUT WIRE
G00X15.0;

M60;            ・・・CONNECT WIRE
M98P100;
M50;            ・・・CUT WIRE
G00X15.0;

M60;            ・・・CONNECT WIRE
M98P100;
M50;            ・・・CUT WIRE
G00X15.0;

M60;            ・・・CONNECT WIRE
M98P100;
M50;            ・・・CUT WIRE
M30;

SUBPROGRAM 1
O100;
S1D1;           ・・・FIRST MACHINING CONDITION, SET OFFSET
M98P110;        ・・・CALL SUBPROGRAM 2
M01;            ・・・OPTIONAL STOP

S2D2;           ・・・SECOND MACHINING CONDITION, SET OFFSET
M98P110;        ・・・CALL SUBPROGRAM 2
M01;            ・・・OPTIONAL STOP

S3D3;           ・・・THIRD MACHINING CONDITION, SET OFFSET
M98P110;        ・・・CALL SUBPROGRAM 2
M01;            ・・・OPTIONAL STOP
M99;

SUBPROGRAM 2
O110;
G92X0.0Y0.0;    ・・・SET COORDINATE SYSTEM
G91G01G42Y-4.0;
X-5.0;
Y8.0;
X10.0;          ・・・CUTTING FEED
Y-8.0;              (DISCHARGE MACHINING SEGMENT)
X-5.0;
G40Y4.0;
M99;
```

CONTROLLER FOR WIRE ELECTRIC DISCHARGE MACHINE HAVING CONSUMABLE EXCHANGE FUNCTION

RELATED APPLICATIONS

The present application claims priority to Japanese Application Number 2014-255265, filed Dec. 17, 2014, the disclosure of which is hereby incorporated by reference herein in its entirety.

BACKGROUND OF THE INVENTION

Field of the Invention

The present invention relates to a controller for a wire electric discharge machine having a consumable exchange function.

Description of the Related Art

In a case where a wire electric discharge machine is incorporated in a mass-production machining line in a manufacturing factory, the machine is required to be continuously operated for a long period to improve productivity. In this case, a wire electric discharge machining system including a workpiece exchanging unit that automatically exchanges a workpiece is employed. However, when any of a variety of consumables of the wire electric discharge machine reaches the end of its life and is therefore required to be exchanged, it is necessary to temporarily stop the continuous operation of the machine, manually exchange the consumable, and resume the operation. The series of task obstruct the continuous automatic operation for a long period and therefore hinder improvement in productivity.

Technologies for detecting that a consumable of a wire electric discharge machine has reached the end of its life and detecting a remaining life of a consumable thereof have been proposed, as shown in the following patent literatures. The technologies are, however, directed to how to notify an operator that time for exchange of a consumable has come, for example, by displaying the notification on a display device to prompt the operator to exchange the consumable.

Japanese Patent Application Laid-Open No. 2010-179377 discloses a wire electric discharge machine that detects the amount of remaining wire based on detected wire tension, wherein the machine analyzes a machining program before a workpiece is machined to determine a wire length necessary for the machining, compares the determined wire length with the detected amount of remaining wire to evaluate whether or not a wire bobbin is required to be exchanged, and displays a result of the evaluation on a display device.

Japanese Patent Application Laid-Open No. 2003-25155 discloses a wire electric discharge machine that calculates the amount of remaining wire, analyzes a machining program to calculate the amount of wire to be consumed for each machining condition unit, and compares the amount of remaining wire with the amount of consumed wire to notify a point of time when the no wire is left or a point of time when a wire electrode should be exchanged.

Japanese Patent Application Laid-Open No. 5-42414 discloses a controller for a wire electric discharge machine, wherein the controller issues, when a turbidity or pH value of a machining liquid is smaller than a predetermined value, a warning that prompts an operator to exchange a filter.

Japanese Patent Application Laid-Open No. 5-305520 discloses a wire electric discharge machine that detects the degree of consumption of upper and lower power feeders (electrode pins) based on the impedance of each of the upper and lower power feeders and a preset value for evaluation.

Japanese Patent Application Laid-Open No. 2004-358573 discloses a machining liquid processing apparatus for a wire electric discharge machine, wherein the processing apparatus monitors ion exchange performance (specific resistance) of an ion exchange resin to estimate the life of the ion exchange resin and displays a result of the estimation on display means. The processing apparatus has a configuration in which an alarm is displayed in accordance with the life to prompt an operator to exchange the ion exchange resin.

Japanese Patent Application Laid-Open No. 9-216129 discloses an electric discharge machine including a workpiece handing robot that removes a workpiece and a core, wherein the workpiece handing robot is disposed in a position outside a machining tank.

Japanese Patent Application Laid-Open No. 8-118151 discloses a wire electric discharge machine that automatically exchanges a head having power feeders (electrode pins) and a wire guide, wherein durable hours of the power feeders are registered in advance and when hours of operation of the wire electric discharge machine become equal to the durable hours, machining operation is temporarily stopped and the head is exchanged.

Japanese Patent Application Laid-Open No. 7-266137 discloses a wire electric discharge machine having a workpiece exchanger including means for drying a machined workpiece and means for preventing the machined workpiece from rusting.

SUMMARY OF THE INVENTION

In the wire electric discharge machine described in Japanese Patent Application Laid-Open No. 2010-179377 mentioned above, which analyzes a machining program to determine a wire length and evaluates whether or not the wire bobbin is required to be exchanged, the evaluation of whether or not the wire bobbin is required to be exchanged is made before the machining operation because an operator is assumed to exchange the wire bobbin. Exchanging the wire bobbin at the timing before the machining operation increases loss of discarded wire, which is inefficient, in wire electric discharge machining, in which machining that takes 10 hours or longer is very common. Further, manual exchange performed by an operator is not suitable for continuous automatic operation for a long period and therefore provides no effect of improving productivity.

In the wire electric discharge machine described in Japanese Patent Application Laid-Open No. 2003-25155 mentioned above, which is arranged to analyze a machining program to notify a point of time when the a wire electrode should be exchanged, the notification is made for each machining condition unit. Further, since an operator is assumed to exchange a wire, it is not intended to exchange the wire electrode or resume programmed operation after the exchange. The machine is therefore not suitable for continuous automatic operation for a long period, and a very advantageous effect of improving productivity is not expected. In contrast, the present invention, which will be described later, is so arranged that after a consumable has reached the end of its life, whether the discharge has stopped is monitored to evaluate time for exchange of the consumable. The present invention differs from the technology described in Japanese Patent Application Laid-Open No. 2003-25155 in this regard.

The controller for a wire electric discharge machine described in Japanese Patent Application Laid-Open No. 5-42414 mentioned above, which is so arranged that time for exchange of a filter is notified based on comparison of a turbidity or pH value of a machining liquid with a predetermined value, differs from the invention of the present application, which will be described later, in terms of configuration and is not intended to issue an instruction to exchange the filter.

The wire electric discharge machine described in Japanese Patent Application Laid-Open No. 5-305520 mentioned above, which compares the impedance of each of the upper and lower power feeders (electrode pins) with a plurality of preset values for evaluation to determine optimum time for exchange of the power feeders, differs from the invention of the present application, which will be described later, in terms of configuration and is not intended to issue an instruction to exchange the power feeders.

The wire electric discharge machine including a machining liquid processing apparatus described in Japanese Patent Application Laid-Open No. 2004-358573 mentioned above is so arranged that an operator is prompted to exchange the ion exchange resin but differs from the invention of the present application, which will be described later, in terms of configuration and does not have a configuration in which an instruction to exchange the ion exchange resin is issued.

The electric discharge machine including a workpiece handing robot that removes a workpiece and a core described in Japanese Patent Application Laid-Open No. 9-216129 mentioned above has means for exchanging a workpiece but does not have a configuration capable of exchanging consumables.

The wire electric discharge machine described in Japanese Patent Application Laid-Open No. 8-118151 mentioned above is so configured that time for exchange of the head is evaluated based on hours of operation of the machine and pre-registered durable hours of the power feeders and therefore differs from the invention of the present application, which will be described later, in terms of configuration. That is, the exchange of the head temporality requires stopping discharge machining in the course thereof, resulting in a streaking pattern generated on a machined surface when machining is resumed, which undesirably degrades surface quality. The invention of the present application, which will be described later and is so configured that discharge machining is not stopped in the course thereof, has a configuration capable of solving the problem of generation of a streaking pattern on a machined surface at the time of machining resumption and degradation in surface quality.

The wire electric discharge machine described in Japanese Patent Application Laid-Open No. 7-266137 mentioned above includes means for drying a workpiece, means for preventing a workpiece from rusting, and an exchanging unit but does not have a configuration capable of exchanging a consumable.

As described above, technologies for detecting that a consumable of a wire electric discharge machine has reached the end of its life and detecting a remaining life of a consumable thereof have been proposed. The technologies are, however, directed to how to notify an operator that time for exchange of a consumable has come, for example, by displaying the notification on a display device to prompt the operator to exchange the consumable. However, when any of a variety of consumables reaches the end of its life and is required to be exchanged, it is necessary for an operator to temporarily stop continuous operation of the machine, manually exchange the consumable, and resume the operation. The series of task obstruct continuous automatic operation for a long period and therefore hinder improvement in productivity.

In wire electric discharge machining, a cause that prevents automatic operation is the problem of temporal stoppage of discharge machining in the course thereof, followed by generation of a streaking pattern on a machined surface at the time of machining resumption, resulting in degradation in quality of the machined surface. The problem occurs because a temporal short circuit or any other disadvantageous effect occurs between the wire electrode and a workpiece when the machining is resumed and a discontinuous discharge state therefore occurs. The problem prevents a consumable from being simply exchanged even when the consumable reaches the end of its life. Therefore, as a common practice, an operator exchanges a consumable by choosing appropriate timing when discharge machining is interrupted while using the information displayed on the display device described above or other types of information as a reference.

An object of the present invention is to provide a controller for a wire electric discharge machine having a consumable exchange function in order to allow an operator to exchange a consumable of the wire electric discharge machine when time for exchange of the consumable is reached without stoppage of continuous operation of the machine or manual intervention.

A controller for a wire electric discharge machine according to the present invention has a function of creating a machining path based on an axis movement instruction in a machining program, performing programmed operation in accordance with the machining program, and moving a wire electrode and a workpiece relative to each other in accordance with the created machining path and includes a programmed operation controlling unit that executes the machining program, a consumable life reaching monitoring unit that monitors whether a consumable has reached an end of life thereof, a discharge state monitoring unit that monitors a discharge state during the programmed operation, a consumable exchange time evaluating unit that refers to a result of the monitoring performed by the consumable life reaching monitoring unit and a result of the monitoring performed by the discharge state monitoring unit to evaluate time for exchange of the consumable, a programmed operation stoppage instructing unit that outputs an instruction to stop the programmed operation to the programmed operation controlling unit when the time for exchange of the consumable has been reached, a consumable exchange controlling unit that outputs an instruction to exchange the consumable to a consumable exchanging unit and monitors whether the consumable has been exchanged, the consumable exchanging unit for exchanging a consumable; and a programmed operation resumption instructing unit that outputs an instruction to resume the programmed operation to the programmed operation controlling unit when the consumable exchanging unit has completed the exchange of the consumable.

The consumable exchanging unit may be a robot.

The consumable can be at least one of a filter, an electrode pin, and an ion exchange resin.

According to the present invention, the consumable exchanging unit can achieve automatic exchange of a consumable with no concern about degradation in quality of a machined surface and eliminate a need for an operator who exchanges consumables. Further, after the consumable has been exchanged, the programmed operation can be resumed, whereby drastic improvement in productivity in wire electric discharge machining can be expected.

BRIEF DESCRIPTION OF THE DRAWINGS

The forgoing and other objects and feature of the invention will be apparent from the following description of preferred embodiments of the invention with reference to the accompanying drawings, in which:

FIG. 3 shows an example of a machining program in which machining is repeated three times.

DETAILED DESCRIPTION OF THE PREFERRED EMBODIMENTS

Figure 1:
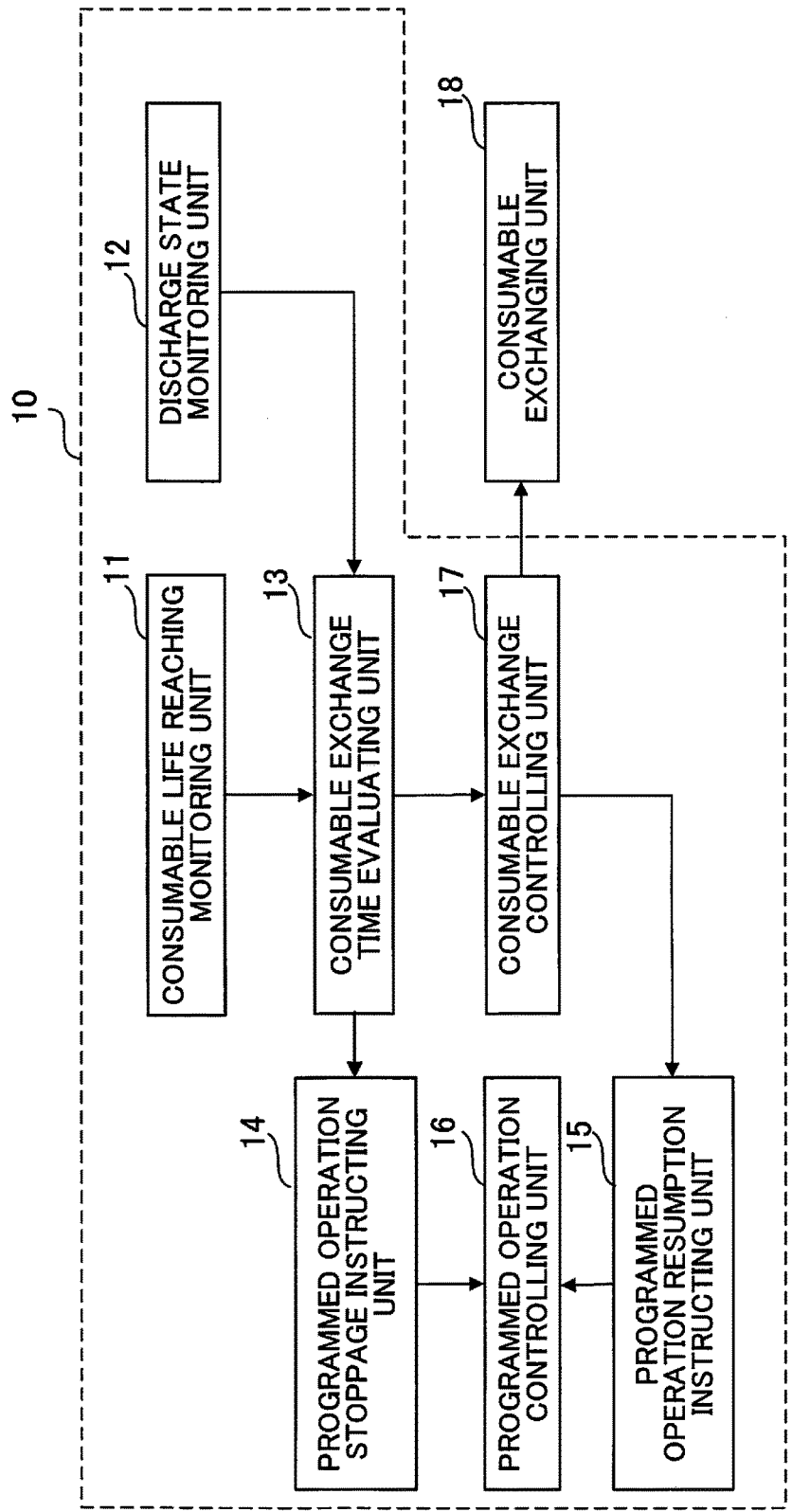
FIG. 1 is a block diagram showing an embodiment of a controller for a wire electric discharge machine having a consumable exchange function according to the present invention.

An embodiment of a controller for a wire electric discharge machine having a consumable exchange function according to the present invention will be described with reference to FIG. 1.

A controller for a wire electric discharge machine 10 includes a consumable life reaching monitoring unit 11, a discharge state monitoring unit 12, and a consumable exchange time evaluating unit 13 and is configured to be capable of recognizing a consumable having reached the end of its life and the timing at which discharge machining is interrupted. In accordance with the timing at which discharge machining is interrupted, a programmed operation stoppage instructing unit 14 temporarily stops programmed operation, and the consumable exchange time evaluating unit 13 sends an evaluation result representing that time for exchange of a consumable has been reached to a consumable exchange controlling unit 17. The consumable exchange controlling unit 17 can instruct a consumable exchanging unit 18 to exchange the consumable for automatic exchange of the consumable. Further, after the consumable is exchanged, a programmed operation resumption instructing unit 15 can resume the programmed operation.

In the controller for a wire electric discharge machine 10, the consumable exchange time evaluating unit 13 evaluates whether time for exchange of a consumable has been reached based on a signal from the consumable life reaching monitoring unit 11 and a signal from the discharge state monitoring unit 12. Specifically, when the consumable exchange time evaluating unit 13 receives a signal representing that time for exchange of a consumable has been reached from the consumable life reaching monitoring unit 11 and then receives a state signal representing that the machine is not in a discharge state from the discharge state monitoring unit 12, the consumable exchange time evaluating unit 13 determines that time for exchange of the consumable has been reached but otherwise determines that time for exchange of the consumable has not been reached.

When receiving the evaluation result representing that time for exchange of a consumable has been reached from the consumable exchange time evaluating unit 13, the programmed operation stoppage instructing unit 14 outputs an instruction to stop the programmed operation to a programmed operation controlling unit 16. After the exchange of the consumable is completed, the programmed operation resumption instructing unit 15 outputs an instruction to resume the programmed operation to the programmed operation controlling unit 16.

The programmed operation controlling unit 16 executes a machining program to control the programmed operation. When receiving the instruction to stop the programmed operation from the programmed operation stoppage instructing unit 14, the programmed operation controlling unit 16 stops the programmed operation, whereas when receiving the instruction to resume the programmed operation from the programmed operation resumption instructing unit 15, the programmed operation controlling unit 16 resumes the programmed operation.

When receiving the evaluation result representing that time for exchange of a consumable has been reached from the consumable exchange time evaluating unit 13, the consumable exchange controlling unit 17 outputs an instruction to exchange the consumable to the consumable exchanging unit 18 and checks whether the exchange of the consumable has been completed or not. The consumable exchange controlling unit 17 may instead output the instruction to exchange the consumable after it is checked that the programmed operation has been stopped.

When receiving the instruction to exchange the consumable from the consumable exchange controlling unit 17, the consumable exchanging unit 18 exchanges the consumable. An industrial robot may be used as the consumable exchanging unit 18.

As for consumables, examples of a primary consumable used in a wire electric discharge machine may include a filter, an electrode pin, and an ion exchange resin. The filter is used to clean a machining liquid that has undergone machining, by filtering the machining liquid to remove sludge. If sludge is accumulated in the filter, the pressure in the filter increases and a risk of explosion of the filter increases when the pressure becomes higher than a limit. To avoid the explosion, the filter is exchanged and discarded when the filter has reached the end of its life.

Whether or not a filter has reached the end of its life can be evaluated by comparing a preset life period of the filter with hours of operation of the machine since a new filter was installed. Whether or not a filter has reached the end of its life can instead be evaluated by monitoring the pressure in the filter and comparing the pressure in the filter with withstand pressure of the filter. Whether or not the life has expired can be more exactly evaluated, for example, by using the method described in Japanese Patent Application Laid-Open No. 5-42414 mentioned above.

The electrode pin supplies a wire electrode with machining pulse voltage. The electrode pin is consumed due to friction between the electrode pin and the wire electrode. Since the consumed electrode pin may degrade the contact between the wire electrode and the electrode pin to lower power feed efficiency, resulting in abnormal discharge or broken wire in some cases, the electrode pin is required to be exchanged when the life thereof has expired. Whether the electrode pin has reached the end of its life can be evaluated by comparing a preset life period of the electrode pin with hours of operation of the machine since a new electrode pin was installed. Whether or not the life has expired can be more exactly monitored, for example, by using the method described in Japanese Patent Application Laid-Open No. 5-305520 mentioned above.

The ion exchange resin is used to maintain the specific resistance of the machining liquid at a constant value. Since the ion exchange performance of an ion exchange resin degrades with time and a change in the specific resistance of the machining liquid during machining causes insufficient machining precision, the ion exchange resin is required to be exchanged when the life thereof has expired. Whether an ion exchange resin has reached the end of its life can be evaluated by comparing a preset life period of the ion exchange resin with hours of operation of the machine since a new ion exchange resin was installed. Whether or not the life has expired can be more exactly evaluated, for example, by using the method described in Japanese Patent Application Laid-Open No. 2004-358573 mentioned above.

The consumable life reaching monitoring unit 11 monitors whether a consumable has reached the end of its life and outputs, when the life has expired, a signal representing that the life has expired. The discharge state monitoring unit 12 monitors the discharge state, for example, by analyzing the machining program or monitoring discharge data and outputs a state signal.

An example of analysis of a machining program is shown below.

Figure 2:
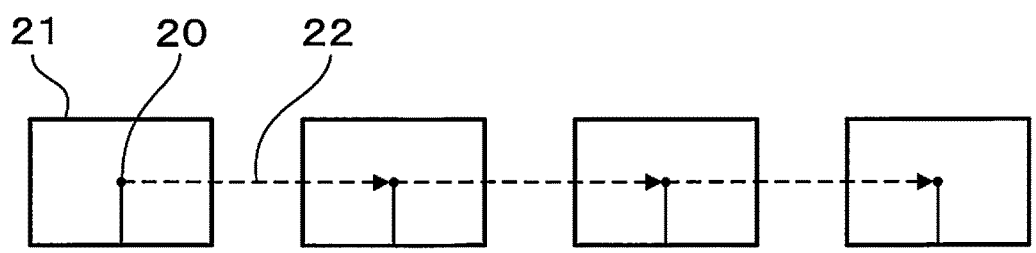
FIG. 2 shows machining of a workpiece according to a machining program shown in FIG. 3.

FIG. 2 shows machining of a workpiece according to a machining program shown in FIG. 3. FIG. 3 shows an example of a machining program in which the machining shown in FIG. 2 is repeated three times.

Wire electric discharge machining starts from a machining start position 20, and a wire electrode moves along a machining path 21 relative to a workpiece and returns to the machining start position 20. The wire electrode is then cut and moved relative to the workpiece to the following machining start position in rapid traverse 22. Consider a case where the machining shown in FIG. 2 is repeated three times by way of example. In this case, discharge machining is performed in a block in the machining program where G01 instruction (see SUBPROGRAM 2 in FIG. 3) is executed. Since the quality of a machined surface degrades when the discharge is temporarily stopped in this block, a state signal representing that the machine is in the discharge state is outputted in this block. Since no discharge machining is performed in the other blocks, a state signal representing that the machine is not in the discharge state is outputted in these blocks.

In related art, an operator monitors the life of a consumable, uses an optional stop instruction M01 (see SUBPROGRAM 1 in FIG. 3) to temporarily stop the programmed operation after the discharge machining is completed, followed by exchange of the consumable. In a case where discharge data is monitored to monitor the discharge state, a method for monitoring the number of discharge pulses, a machining current value, or any other parameter can be employed. In the case where the number of discharge pulses (the number of discharge operations per unit time) is monitored, it can be assumed that the machine is in the discharge state when any discharge pulse is observed, whereas the machine is not in the discharge state when no discharge pulse is observed. In the case where the machining current value is monitored, it can also be assumed that the machine is in the discharge state when any machining current value is observed, whereas the machine is not in the discharge state when no machining current value is observed.

Figure 4:
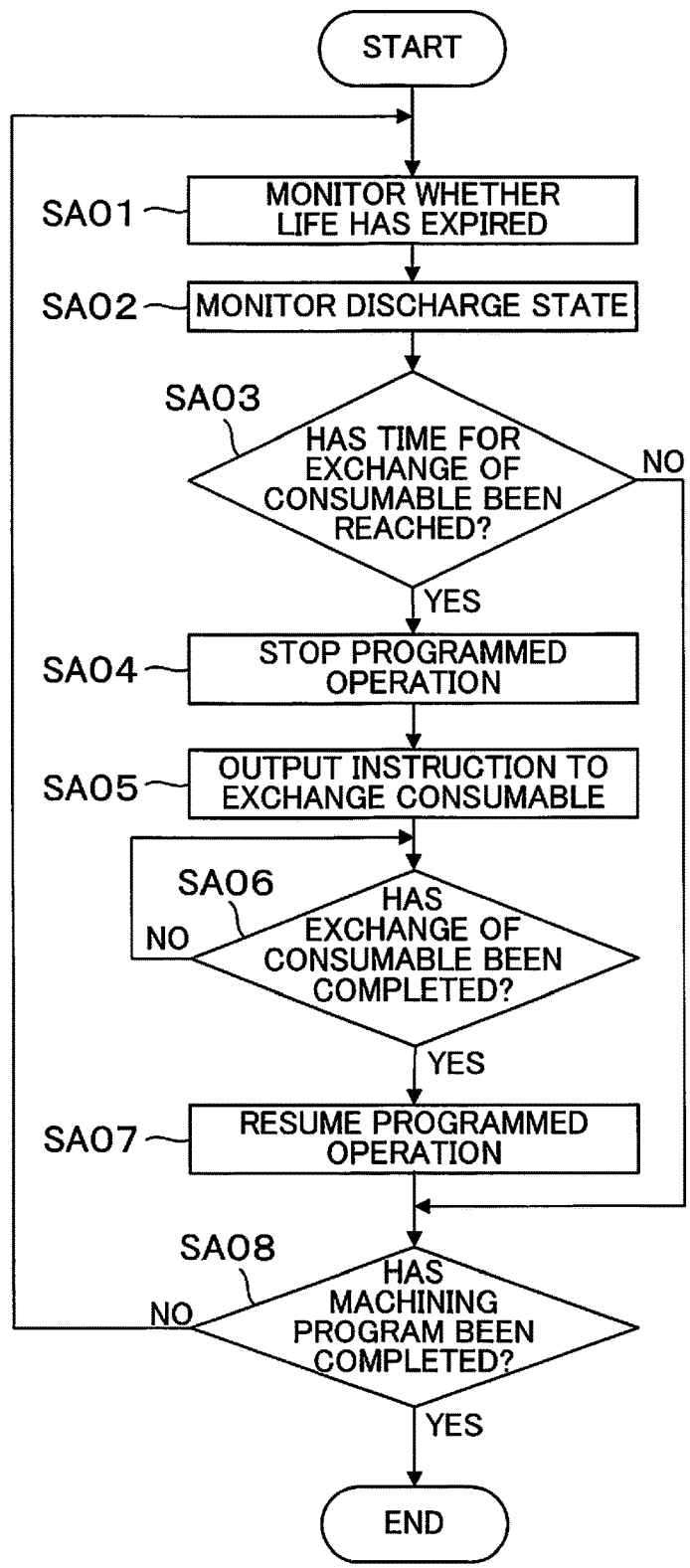
FIG. 4 shows the procedure of control performed by the controller for a wire electric discharge machine shown in FIG. 1.

FIG. 4 shows the procedure of the control performed by the controller for a wire electric discharge machine shown in FIG. 1.

[Step sa01] Whether a consumable has reached the end of its life is monitored.
[Step sa02] The discharge state is monitored.
[Step sa03] It is evaluated whether or not the consumable should be exchanged. When a result of the evaluation shows that the consumable should be exchanged (YES), the procedure proceeds to step sa04, whereas when a result of the evaluation shows that the consumable should not be exchanged (NO), the procedure proceeds to step sa08. In other words, as described above, the consumable exchange time evaluating unit 13 evaluates time for exchange of the consumable based on the signals from the consumable life reaching monitoring unit 11 and the discharge state monitoring unit 12. Specifically, when receiving a signal representing that the consumable has reached the end of its life from the consumable life reaching monitoring unit 11 and then a state signal representing that the machine is not in the discharge state from the discharge state monitoring unit 12, the consumable exchange time evaluating unit 13 determines that time for exchange of the consumable has been reached and otherwise determines that time for exchange of the consumable has not reached.
[Step sa04] Programmed operation is stopped.
[Step sa05] An instruction to exchange the consumable is output.
[Step sa06] It is evaluated whether or not the exchange of the consumable has been completed. When a result of the evaluation shows that the exchange has been completed (YES), the procedure proceeds to step sa07, whereas when a result of the evaluation shows that the exchange has not been completed (NO), the procedure waits for the completion of the exchange and then proceeds to step sa07.
[Step sa07] The programmed operation is resumed.
[Step sa08] It is evaluated whether or not the machining program has been completed. When a result of the evaluation shows that the machining program has not been completed (NO), the procedure returns to step sa01 and continues the process, whereas when a result of the evaluation shows that the machining program has been completed (YES), the procedure completes the process.

The invention claimed is:

1. A controller for a wire electric discharge machine, the controller creating a machining path based on an axis movement instruction in a machining program, performing programmed operation in accordance with the machining program, and moving a wire electrode and a workpiece relative to each other in accordance with the created machining path, the controller is configured to:
   execute the machining program;
   monitor whether a consumable has reached an end of life thereof;
   monitor a discharge state during the programmed operation;
   refer to a result of monitoring the consumable and a result of monitoring the discharge state to evaluate time for exchange of the consumable;
   output an instruction to stop the executed programmed operation when the time for exchange of the consumable has been reached;
   output an instruction to exchange the consumable to exchange the consumable when receiving the instruction to exchange the consumable and monitor whether the consumable has been exchanged; and
   output an instruction to resume the programmed operation when the exchange of the consumable has been completed.

2. The controller according to claim 1, wherein the exchange of the consumable is performed by a robot.

3. The controller according to claim 1, wherein the consumable is at least one of a filter, an electrode pin, and an ion exchange resin.

4. The controller according to claim 2, wherein the consumable is at least one of a filter, an electrode pin, and an ion exchange resin.

* * * * *